US012593818B2

(12) United States Patent
Hogan

(10) Patent No.: US 12,593,818 B2
(45) Date of Patent: Apr. 7, 2026

(54) UNLOADING AUGER

(71) Applicant: The GSI Group, LLC, Assumption, IL (US)

(72) Inventor: Alan C. Hogan, Assumption, IL (US)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 18/715,931

(22) PCT Filed: Nov. 11, 2022

(86) PCT No.: PCT/IB2022/060863
§ 371 (c)(1),
(2) Date: Jun. 3, 2024

(87) PCT Pub. No.: WO2023/105320
PCT Pub. Date: Jun. 15, 2023

(65) Prior Publication Data
US 2025/0031666 A1      Jan. 30, 2025

Related U.S. Application Data

(60) Provisional application No. 63/265,074, filed on Dec. 7, 2021.

(51) Int. Cl.
*A01K 5/02*          (2006.01)

(52) U.S. Cl.
CPC .......... *A01K 5/0258* (2013.01); *A01K 5/0225* (2013.01)

(58) Field of Classification Search
CPC . A01K 5/0258; A01K 5/0225; A01F 25/2018; B65G 65/46
See application file for complete search history.

(56) References Cited

U.S. PATENT DOCUMENTS

| | | | |
|---|---|---|---|
| 3,130,707 A | 4/1964 | Cleaveland | |
| 3,543,948 A * | 12/1970 | Tatum | B65G 33/34 |
| | | | 414/326 |

(Continued)

FOREIGN PATENT DOCUMENTS

| | | |
|---|---|---|
| CA | 2768953 A1 | 8/2013 |
| CN | 214609848 U | 11/2021 |

OTHER PUBLICATIONS

UK Intellectual Property Office, Search Report for related UK Application No. GB2118345.4, dated Apr. 14, 2022, 3 pages.

(Continued)

*Primary Examiner* — Ebony E Evans
(74) *Attorney, Agent, or Firm* — RAY QUINNEY & NEBEKER; Daniel J. Bezdjian

(57) ABSTRACT

A feed supply system used in distributing feed grain from a feed tank includes a boot unloader coupled to an upstream end of at least one conveyor tube in fluid communication with a downwardly opening aperture of the feed tank. The boot unloader includes an unloader body formed of a front panel and a rear panel to form a receiving portion into which feed grain flows from the feed tank. At least one auger is partially received in the unloader body and extends from the unloader body into a respective conveyor tube. The auger is secured to the rear panel with an end bearing and has a helical flighting configured to rotate about an auger axis. An auger retention mechanism extends between the front panel and the rear panel of the boot unloader and positioned above the auger axis so that the auger retention mechanism prevents the flighting from deforming upwards within the boot unloader.

17 Claims, 5 Drawing Sheets

(56)            References Cited

U.S. PATENT DOCUMENTS

| | | | |
|---|---|---|---|
| 4,361,117 A | | 11/1982 | Tohme |
| 5,125,771 A | | 6/1992 | Herman et al. |
| 5,387,058 A | * | 2/1995 | Smoot .................... B65G 53/42 |
| | | | 280/43.23 |
| 5,474,027 A | | 12/1995 | Pollock |
| 5,513,597 A | * | 5/1996 | Pollock ............... A01K 5/0258 |
| | | | 119/57.4 |
| 11,064,724 B2 | * | 7/2021 | Maupin ................... A23B 7/06 |
| 2014/0261199 A1 | | 9/2014 | Rose et al. |
| 2019/0293336 A1 | * | 9/2019 | Bertolini ................ F25C 5/142 |
| 2021/0169040 A1 | | 6/2021 | Hogan |
| 2022/0095543 A1 | * | 3/2022 | Sorenson ............. A01F 25/163 |

OTHER PUBLICATIONS

European Patent Office, International Search Report related to International Patent Application No. PCT/IB2022/060863, mail date Mar. 16, 2023, 13 pages.

* cited by examiner

MOUNTING PIPE

UNLOADING AUGER

CROSS-REFERENCE TO RELATED APPLICATIONS

This application is a national phase entry under 35 U.S.C. § 371 of International Patent Application PCT/IB2022/060863, filed Nov. 11, 2022 designating the United States of America and published in English as International Patent Publication WO 2023/105320 A1 on Jun. 15, 2023, which claims the benefit of the filing date of U.S. Provisional Patent Application 63/265,074 "Unloading Auger," filed Dec. 7, 2021, the entire disclosure of which is incorporated herein by reference.

BACKGROUND OF THE INVENTION

Field of Invention

This invention relates to livestock feed storage systems, and more particularly to a device that maintains the flow of feed, or similar substances, from a bulk storage tank downwardly through an attached boot and unloader for delivery to an auger system that transports the feed to a feed dispenser.

Description of Related Art

Livestock feed systems allow for storage of livestock feed in a central storage tank or bin. From the storage tank, a feed supply system having one or more conveyor tubes in which an auger is driven is used to convey the feed along a feed path to where it is presented to the animals such as by drop tubes to feeders located within the livestock building. Augers can provide consistent and steady delivery of feed to livestock in a plurality of locations across a barn or other livestock facility. The feed is fed by gravity from the feed bin into the auger through a boot unloader located under the feed tank. Livestock facilities have different requirements for the desired configuration of the feed supply system. Sometimes it is desired to have more than one feed line leading from the bulk tank to the livestock buildings.

Occasionally, clumps of grain or foreign objects may work their way into the feed supply system and into the auger itself. If this occurs, the flow of feed may be obstructed, and may cause damage to the auger and other components of the feed supply system.

BRIEF SUMMARY

In one aspect, the invention is directed to a bulk feed supply system for use in distributing feed grain from a feed tank. The feed supply system includes a boot unloader coupled to an upstream end of a conveyor tube and having an upwardly opening aperture that is matingly positioned in fluid communication with a downwardly opening aperture of the feed tank. The boot unloader includes an unloader body formed of a front panel, a rear panel and opposing side panels, where each of the side panels is fastened to the front panel and to the rear panel such that the front panel, rear panel and side panels are joined together to form a generally rectangular receiving portion into which feed grain flows from the feed tank, at least one auger partially received in the unloader body and extending from the unloader body into the conveyor tube, the auger secured to the rear panel with an end bearing, where each at least one auger has a helical flighting configured to rotate about an auger axis. An auger retention mechanism extends between the front panel and the rear panel of the boot unloader. The auger retention mechanism is positioned above the auger axis so that the auger retention mechanism prevents the flighting from deforming upwards within the boot unloader.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
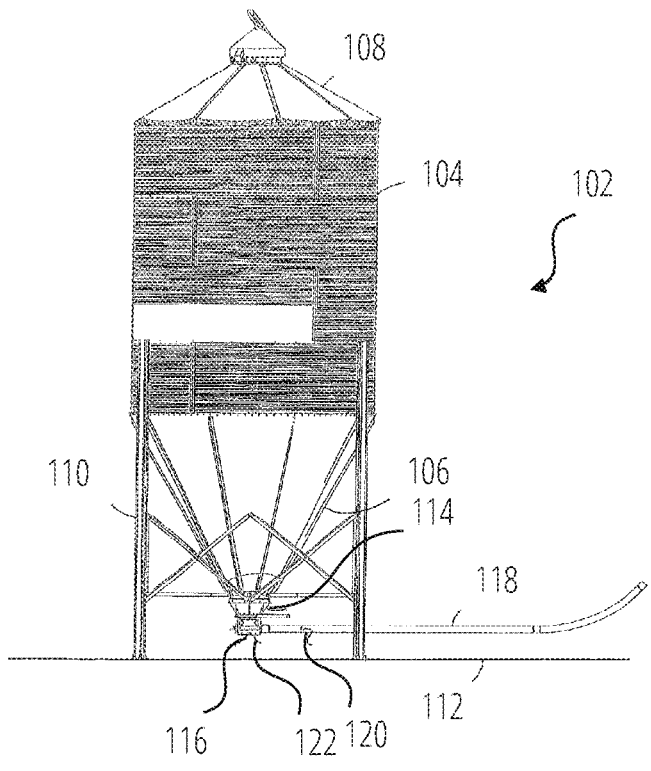
FIG. 1 is a schematic view of bulk feed tank with a feed supply system having a boot unloader according to an embodiment of the invention.

Referring to the Figures, FIG. 1 shows a bulk feed tank 102 such as one that would be located proximate an animal building (not shown) in which an animal feeding system is installed. Typically, such bulk feed tanks 102 (or other storage silos or bins) are used in conjunction with feeding systems to store large quantities of feed grain for distribution to one or more feeders from which animals eat the feed grain. The animal building and feeding system may be of any conventional design and would be known to one skilled in the art and need not be discussed herein. As shown, the bulk feed tank 102 has a cylindrical upper portion 104 that is disposed above a generally frusto-conical lower outlet section 106. A conical roof 108 prevents moisture and rain from entering the interior of the bulk feed tank 102. Legs 110 that are anchored into a concrete pad 112 support the bulk feed tank 102 above the ground.

At the bottom end of the lower outlet section 106, an outlet boot 114 is provided for directing the feed stored within the bulk feed tank 102. The outlet boot 114 is disposed below the lower outlet section 106 and includes a downwardly opening aperture, out of which feed grain stored within the interior of the bulk feed tank 102 can flow under the influence of gravity into a feed supply system 116. The feed supply system 116 has a conveyor tube 118 through which a rotating auger 120 delivers feed from the feed tank 102 to the livestock building.

The feed supply system 116 includes a boot unloader 122 having an upwardly opening aperture that is matingly positioned in fluid communication with the downwardly opening aperture of the outlet boot 114 of the bulk feed tank 102. The boot unloader 122 is coupled to an upstream end of the conveyor tube 118 of the feed supply system 116. As is known in the art, the feed supply system 116 may supply feed grain by means of drop tubes to feeders (not shown) located within the livestock building. Rotation of the auger 120 within the conveyor tube 118 moves grain along the conveyor tube 118 from the boot unloader 122 and into feeders out of which the animals can eat the feed.

Figure 2:
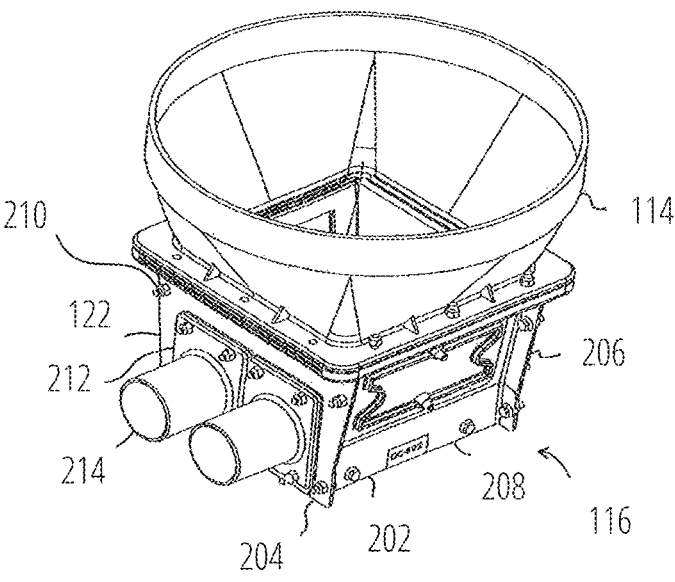
FIG. 2 is a perspective view of the boot unloader of FIG. 1.
Figure 3:
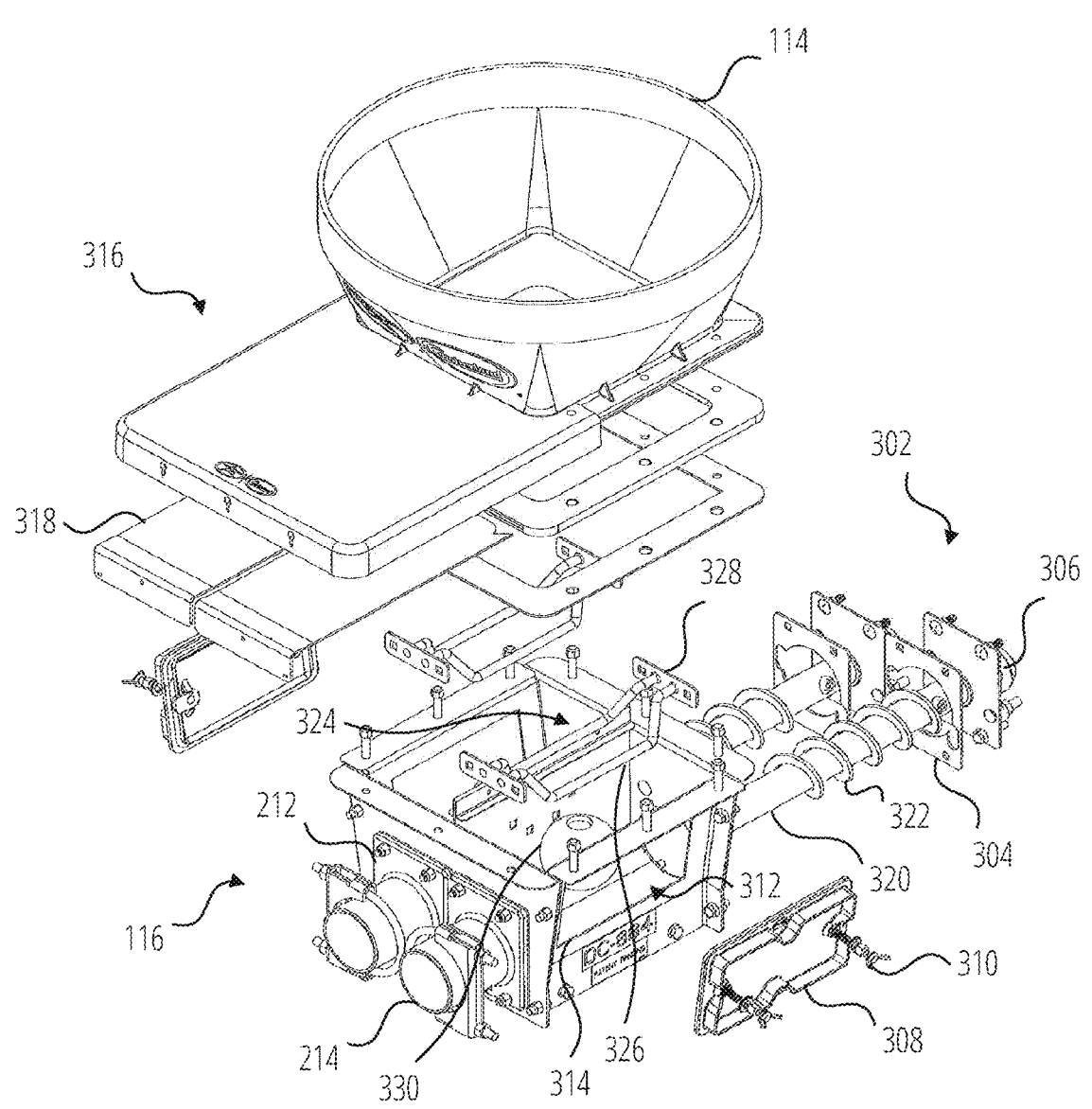
FIG. 3 is an exploded view of the boot unloader of FIG. 2.
Figure 4:
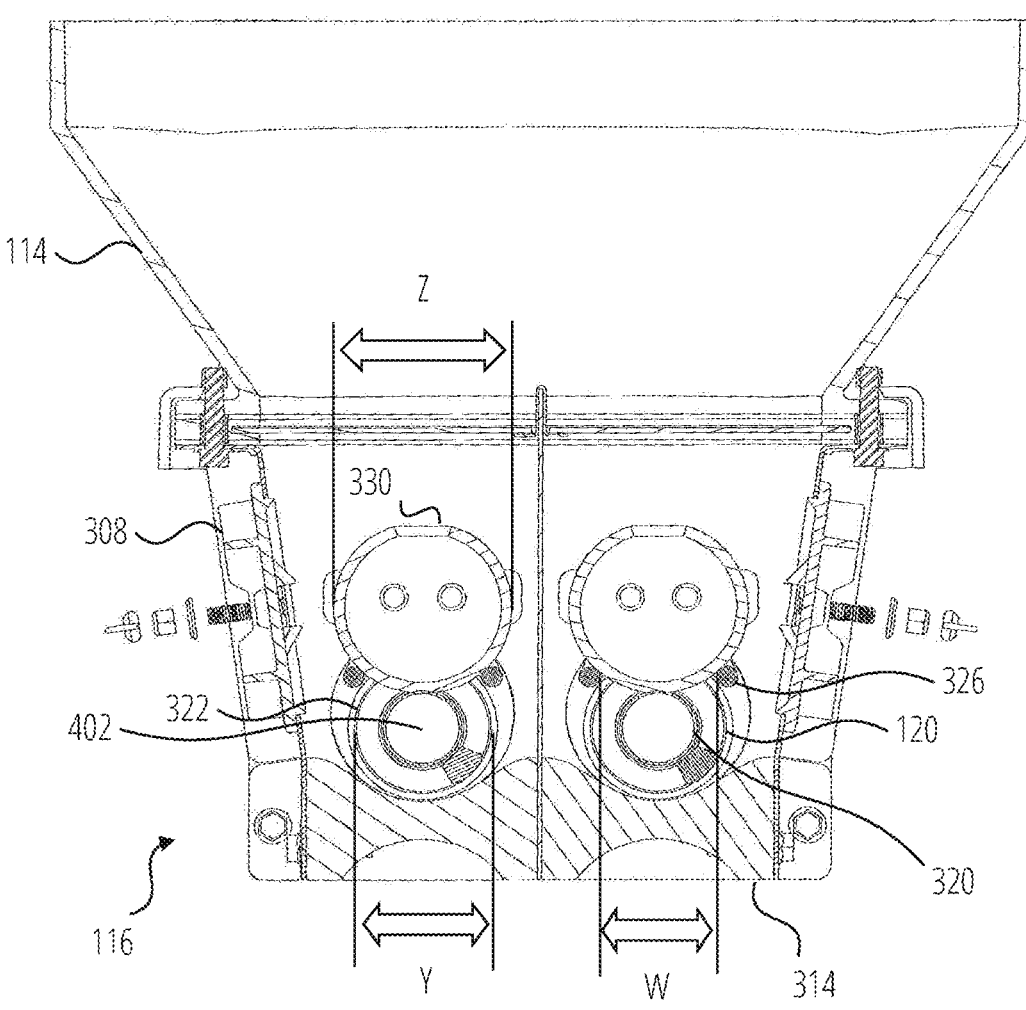
FIG. 4 is a sectional view of the boot unloader of FIG. 2.

Turning also now to FIGS. 2-4, the boot unloader 122 is illustrated according to one embodiment of the invention. The boot unloader 122 has an unloader body 202 formed of a front panel 204, a rear panel 206 and opposing side panels 208 joined together to form a generally rectangular receiving portion into which grain flows from the outlet boot 114. The front, rear and side panels 202, 204, 206 are bolted together with suitable bolts 210, or joined together in any other manner using sound engineering judgement. The front panel 204 receives at least one auger mounting plate 212 having a tube interface 214 for mating with the conveyor tube 118. In the illustrated embodiment, the front panel 204 has two auger mounting plates 212 such that the feed supply system 116 has two feed paths with two conveyor tubes 118 and two augers 120. However, the boot unloader 122 desirably has a modular design such that the front panel 204 can be configured such that it receives one, two, three, four or possibly even more auger mounting plates 212, some of which may be in a vertically stacked arrangement, as required for the requirements of the feed supply system 116.

A bearing assembly 302 secures the auger 120 in the conveyor tube 118 and include a bearing housing 304 and an end bearing 306. The bearing assembly 302 is configured to be secured to the rear panel 206 of the boot unloader 122. The end bearing 306 is configured such that it can be removed from the rear panel 206 and bearing housing 304 if the auger 120 becomes jammed or otherwise inoperable. In the illustrated embodiment, two parallel feed paths extend through the boot unloader 122, each terminating at respective end bearings 306 at the rear side of the boot unloader 122. However, as described above, the boot unloader 122 may have a modular design such that the bearing assembly 302 at the rear panel 206 can be configured such that it receives, one, two, three, four or possibly even more end bearings 306 as required for the number of augers 120 in the feed supply system 116.

The side panels 208 of the boot unloader 122 in this embodiment also includes an access door 308 that is held in place by a pair of fasteners 310. Desirably, the access door 308 is made of a clear plastic material to permit observation of the operation of the boot unloader 122 and also allow access for manual cleaning, unclogging, and repair of the boot unloader 122. The underside of the boot unloader 122 is formed with a wear plate assembly 312 fastened to the unloader body 202. In the illustrated embodiment, the wear plate assembly 312 has two replaceable wear plates 314, one for each of the augers 120 in the feed supply system 116. Desirably, the wear plates 314 can be removed and replaced without having to open the unloader body 202 or remove the augers 120. Desirably, the boot unloader 122 has a sliding feed door assembly 316. The feed door assembly 316 has a feed door 318 shown in the open position, which permits feed to flow from the bulk feed tank 102 into the boot unloader 122. To stop the flow of feed, the feed door 318 can be slid horizontally into a closed position. Closing of the feed door assembly 316 allows the access door 308 to be removed without excess feed spilling from the boot unloader 122.

Each auger 120 has a central pipe 320 secured to the end bearing 306 and helical flighting 322 connected to a suitable motive force (not shown) that causes the flighting 322 to rotate about an auger axis 402 (best seen in FIG. 4).

Extending between the front panel 204 and the rear panel 206 of the boot unloader 122 is an auger retention mechanism 324 configured to prevent the flighting 322 from deforming upwards within the boot unloader 122 in the case that the auger 120 encounters a clod or foreign object that would cause a jam within the feed supply system 116. The auger retention mechanism 324 includes two laterally spaced-apart auger retention wires 326 that extend between a forward auger retention plate 328 connected to the front panel 204 and a rear auger retention plate 328 connected to the rear panel 206. Each auger retention wire 326 is positioned on a respective side of the auger 120 above the auger axis 402 and just outside the cylinder swept by the auger flighting 322 so that during normal operation of the auger 120, the auger retention mechanism 324 does not interfere with rotation of the flighting 322. As shown in FIG. 4, the two auger retention wires 326 are separated by a distance such that the auger retention wires 326 form a separation gap W that is smaller than an outer diameter Y of the flighting 322. As can be seen, if an obstruction were encountered by the auger 120 that would otherwise cause the flighting to deform upwards in the boot unloader 122, the auger retention wires 326 would prevent such upwards deformation of the flighting 322.

The boot unloader 122 may also receive an agitator ball 330 that rides above the auger 120 within the boot unloader 122 that is caused to bounce up and down by the rotation of the flighting 322 such that the agitator ball 330 can break up any clods that may form in the grain being transported by the feed supply system 116 through the boot unloader 122. Desirably, the agitator ball 330 has a diameter Z sized so that a bottom section of the agitator ball 330 fits between the laterally spaced auger retention wires 326 and longitudinal portions of the flighting 322 so as to be able to clean clods forming on the central pipe 320 between adjacent longitudinal portions of the flighting 322.

Figure 5:
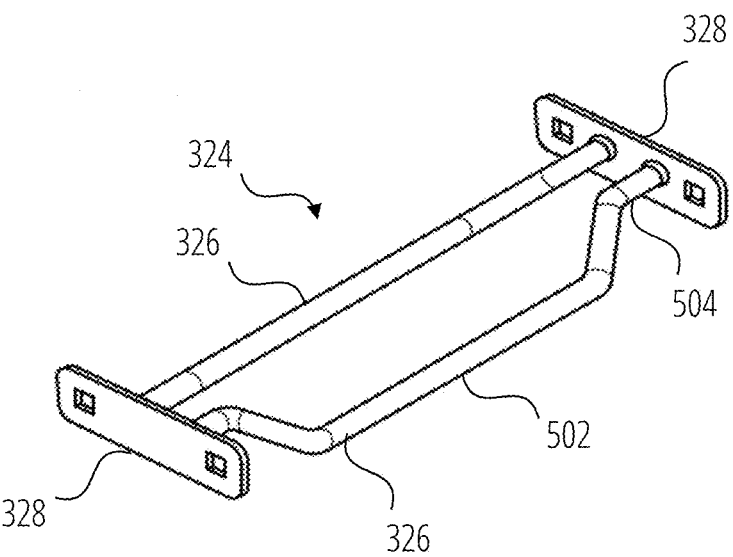
FIG. 5 is a perspective view of an embodiment of an auger retention mechanism in the boot unloader.

Turning now to FIG. 5, each auger retention wire 326 is shaped with a middle body portion 502 configured to extend parallel with the auger axis 402 along a portion of the flighting 322, and outer legs 504 configured to mount to the auger retention plates 328. Desirably the forward auger retention plate 328 has a hole pattern that matches the hole pattern used to mount the auger mounting plate 212 and the rear auger retention plate 328 has a hole pattern that matches the hole pattern used to mount the bearing housing 304 such that the auger retention plates 328 can be mounted to the boot unloader 122 without requiring additional machining of the front panel 204 and rear panel 206. The outer legs bend to accommodate positioning of the body portion 502 while matching up with the position of the auger retention plate 328 needed to match the hole pattern. In one embodiment, the auger retention wires 326 are made of 304 Stainless Steel Grade 2b with a Rockwell hardness of B80. The auger retention wires 326 may have a diameter of between 0.250 inches (6.35 mm) and 0.500 inches (10.27 mm), and in one embodiment have a diameter of 0.375 inches (9.53 mm).

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A bulk feed supply system for use in distributing feed grain from a feed tank, the feed supply system comprising a boot unloader coupled to an upstream end of at least one conveyor tube and having an upwardly opening aperture that is matingly positioned in fluid communication with a downwardly opening aperture of the feed tank, wherein the boot unloader comprises:

an unloader body comprising a front panel and a rear panel into which feed grain flows from the feed tank;

at least one auger partially received in the unloader body and extending from the unloader body into the at least one conveyor tube, the at least one auger secured to the rear panel with an end bearing, wherein the at least one auger has a helical flighting configured to rotate about an auger axis; and an auger retention mechanism attached to the unloader body separate from the at least one auger and the end bearing, the auger retention mechanism extending between the front panel and the rear panel of the boot unloader, the auger retention mechanism positioned above the auger axis so that the auger retention mechanism prevents the flighting from deforming upwards within the boot unloader.

2. The bulk feed supply system of claim 1, wherein the auger retention mechanism comprises two laterally spaced-apart auger retention wires that extend between the front panel and the rear panel.

3. The bulk feed supply system of claim 2, wherein the two laterally spaced-apart auger retention wires connect to a forward auger retention plate that is connected to the front panel and a rear auger retention plate connected to the rear panel.

4. The bulk feed supply system of claim 2, wherein each auger retention wire is positioned on a respective side of the at least one auger above the auger axis and outside a cylinder swept by flighting of the at least one auger so that during normal operation of the at least one auger, the auger retention mechanism does not interfere with rotation of the flighting.

5. The bulk feed supply system of claim 4, wherein the two auger retention wires are separated by a distance such that the auger retention wires form a separation gap W that is smaller than an outer diameter Y of the flighting.

6. The bulk feed supply system of claim 5, further comprising an agitator ball received in the unloader body that rides above the at least one auger within the boot unloader that is caused to bounce up and down by the rotation of the flighting such that the agitator ball breaks up clods that may form in the grain being transported by the feed supply system through the boot unloader, wherein the agitator ball has a diameter Z that is sized so that a bottom section of the agitator ball fits between the two laterally spaced-apart auger retention wires and longitudinal portions of the flighting so as to be able to clean clods forming between adjacent longitudinal portions of the flighting.

7. The bulk feed supply system of claim 5, wherein each auger retention wire is shaped with a middle body portion configured to extend parallel with the auger axis along a portion of the flighting, and outer legs configured to mount to a forward auger retention plate and a rear auger retention plate, wherein the forward auger retention plate has a hole pattern that matches a hole pattern used to mount the at least one conveyor tube to a housing of the boot unloader and the rear auger retention plate has a hole pattern that matches a hole pattern used to mount a bearing housing.

8. The bulk feed supply system of claim 1, further comprising at least one auger mounting plate connected to the front panel, the at least one auger mounting plate comprising a tube interface for connecting with the at least one conveyor tube.

9. The bulk feed supply system of claim 8, wherein the bulk feed supply system comprises at least two auger mounting plates connected to the front panel.

10. The bulk feed supply system of claim 8, wherein a forward auger retention plate has a hole pattern matching a hole pattern of the auger mounting plate.

11. The bulk feed supply system of claim 1, wherein the unloader body further comprises side panels between the front panel and the rear panel.

12. The bulk feed supply system of claim 11, wherein at least one side panel comprises an access door.

13. The bulk feed supply system of claim 1, further comprising a wear plate assembly fastened to the unloader body.

14. The bulk feed supply system of claim 1, further comprising a sliding feed door assembly configured to stop a flow of feed from the upwardly opening aperture into the unloader body.

15. The bulk feed supply system of claim 1, wherein the auger retention mechanism consists of two auger retention wires.

16. The bulk feed supply system of claim 1, wherein the boot unloader is configured to receive multiple auger mounting plates, at least some of the multiple auger mounting plates vertically stacked.

17. The bulk feed supply system of claim 1, wherein two parallel feed paths extend through the unloader.

* * * * *